US009652001B2

(12) United States Patent
Wang et al.

(10) Patent No.: US 9,652,001 B2
(45) Date of Patent: May 16, 2017

(54) CARRIER FOR HARD DISK DRIVE

(71) Applicant: HON HAI PRECISION INDUSTRY CO., LTD., New Taipei (TW)

(72) Inventors: Hung-Yuan Wang, New Taipei (TW); Chun-Wei Chang, New Taipei (TW); Kuo-Feng Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/829,599

(22) Filed: Aug. 18, 2015

(65) Prior Publication Data

US 2017/0052571 A1 Feb. 23, 2017

(51) Int. Cl.
A47B 91/00 (2006.01)
G06F 1/18 (2006.01)
G11B 33/02 (2006.01)

(52) U.S. Cl.
CPC ............ G06F 1/187 (2013.01); G11B 33/027 (2013.01)

(58) Field of Classification Search
CPC .............................. G06F 1/187; G11B 33/027
USPC .. 248/310, 313, 316.5, 346.03, 346.07, 924; 360/99.06; 361/679.33, 679.37, 679.39, 361/755, 809; 369/13.34
See application file for complete search history.

(56) References Cited

U.S. PATENT DOCUMENTS

| 5,641,296 | A  | * | 6/1997  | Larabell | G06F 1/184 |
| | | | | | 439/157 |
| 7,108,530 | B2 | * | 9/2006  | Kimura | G06K 7/0013 |
| | | | | | 361/755 |
| 7,701,706 | B2 | * | 4/2010  | Peng | G11B 33/124 |
| | | | | | 248/633 |
| 8,152,127 | B2 | * | 4/2012  | Chang | G06F 1/182 |
| | | | | | 248/346.03 |
| 8,320,118 | B2 | * | 11/2012 | Chuang | G11B 33/124 |
| | | | | | 211/26 |
| 8,611,081 | B2 | * | 12/2013 | Sun | G11B 33/124 |
| | | | | | 248/222.11 |
| 2005/0066346 | A1 | * | 3/2005  | Wang | H05K 7/1489 |
| | | | | | 720/657 |
| 2005/0198657 | A1 | * | 9/2005  | Wu | G11B 33/124 |
| | | | | | 720/632 |
| 2011/0005068 | A1 | * | 1/2011  | Zhang | G06F 1/187 |
| | | | | | 29/729 |
| 2011/0255235 | A1 | * | 10/2011 | Chen | G06F 1/187 |
| | | | | | 361/679.33 |
| 2012/0236511 | A1 | * | 9/2012  | Shu | G11B 33/124 |
| | | | | | 361/748 |
| 2015/0022069 | A1 | * | 1/2015  | Lv | G06F 1/187 |
| | | | | | 312/309 |

* cited by examiner

Primary Examiner — Gwendolyn Baxter
(74) Attorney, Agent, or Firm — Steven Reiss

(57) ABSTRACT

A carrier includes a frame defining a first space configured to accommodate a first type of hard disk drive, and an adjusting mechanism rotatably coupled to the frame. The adjusting mechanism is transitionable between: (i) a first configuration in which the adjusting mechanism is located outside the first space defined by the frame, and (ii) a second configuration in which the adjusting mechanism is located inside the first space, the adjusting mechanism and the frame cooperatively define a second space configured to accommodate a second type of hard disk drive different from the first type of hard disk drive.

11 Claims, 7 Drawing Sheets

CARRIER FOR HARD DISK DRIVE

FIELD

The present disclosure relates to carriers in electronic devices, and more particularly to a carrier for hard disk drive.

BACKGROUND

Electronic devices generally have carriers for hard disk drives. A typical carrier generally carries one type of hard disk drive.

DETAILED DESCRIPTION

Figure 1:
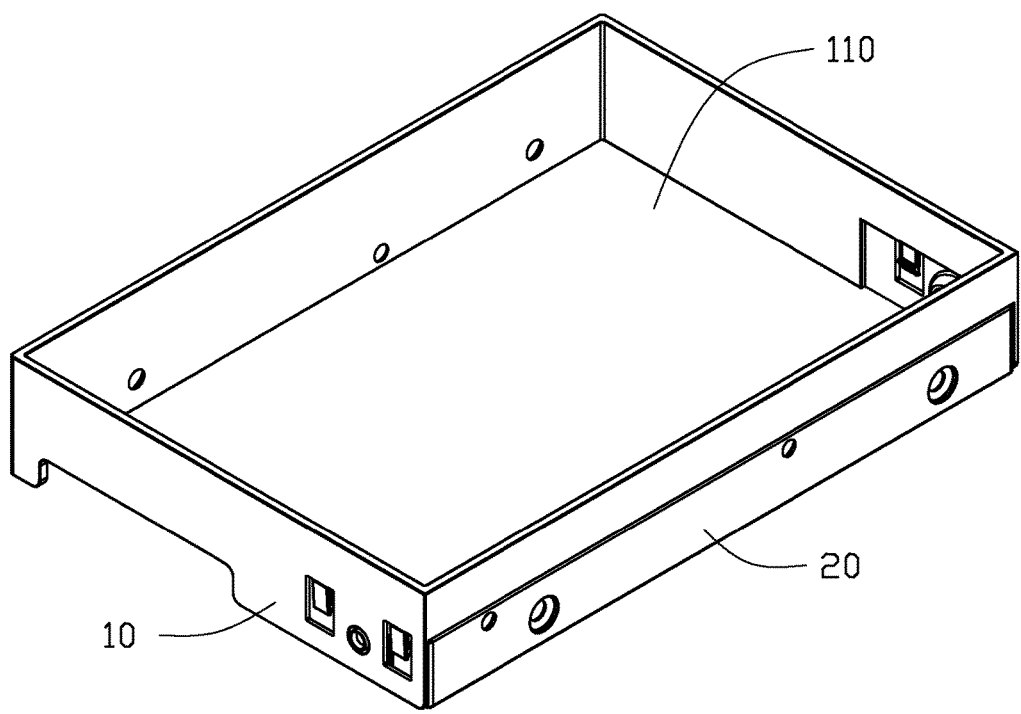
FIG. 1 is an assembled, isometric view of a carrier in a first configuration in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a carrier for hard disk drive. The carrier includes a frame defining a first space configured to accommodate a first type of hard disk drive, and an adjusting mechanism rotatably coupled to the frame. The adjusting mechanism is transitionable between: (i) a first configuration in which the adjusting mechanism is located outside the first space defined by the frame, and (ii) a second configuration in which the adjusting mechanism is located inside the first space, the adjusting mechanism and the frame cooperatively define a second space configured to accommodate a second type of hard disk drive different from the first type of hard disk drive.

Figure 2:
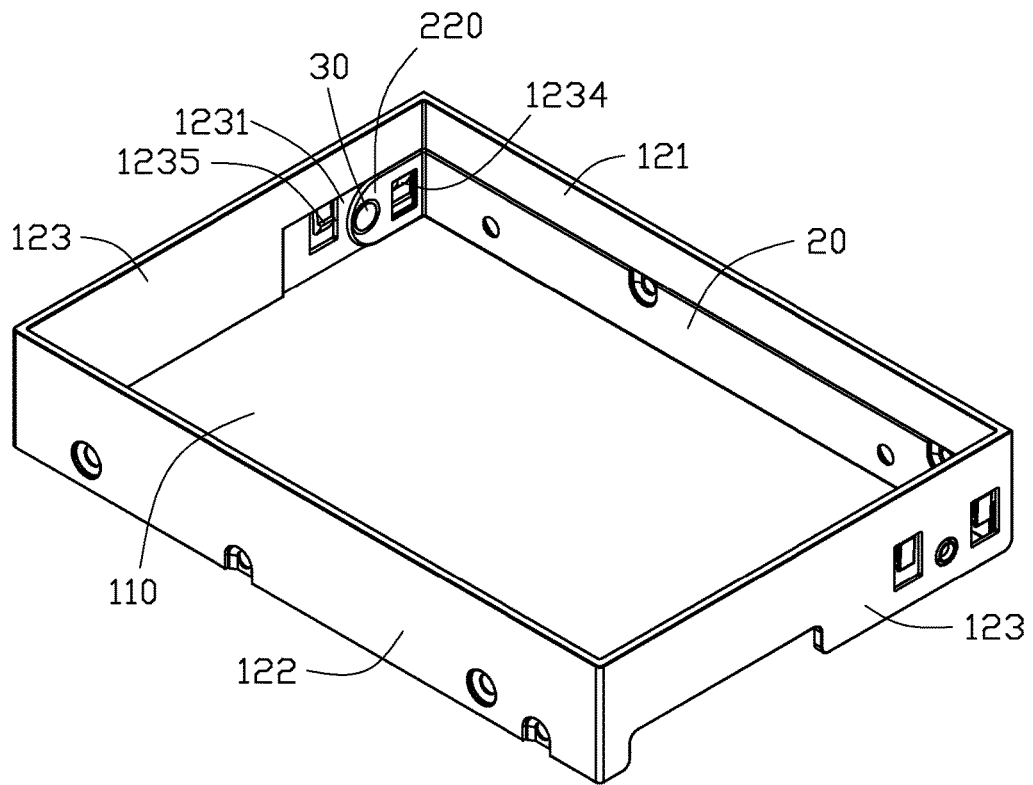
FIG. 2 is another assembled, isometric view of the carrier in FIG. 1 viewed from a different angle.

Referring to FIGS. 1 and 2, a carrier 1 for installing a first type of hard disk drive in accordance with an embodiment is illustrated. The carrier 1 includes a frame 10 and an adjusting mechanism 20 rotatably coupled to the frame 10.

The frame 10 defines a first space 110 configured to accommodate a first type of hard disk drive. The frame 10 includes a plurality of interconnecting walls surrounding the first space 110. In this embodiment, the frame 10 can be in a shape of a substantially rectangular case. The walls can include two opposite coupling walls 123, a connecting wall 121 located between and connecting the two coupling walls 123, and another connecting wall 122 opposite to the connecting wall 121 and connecting the two coupling walls 123.

Figure 3:
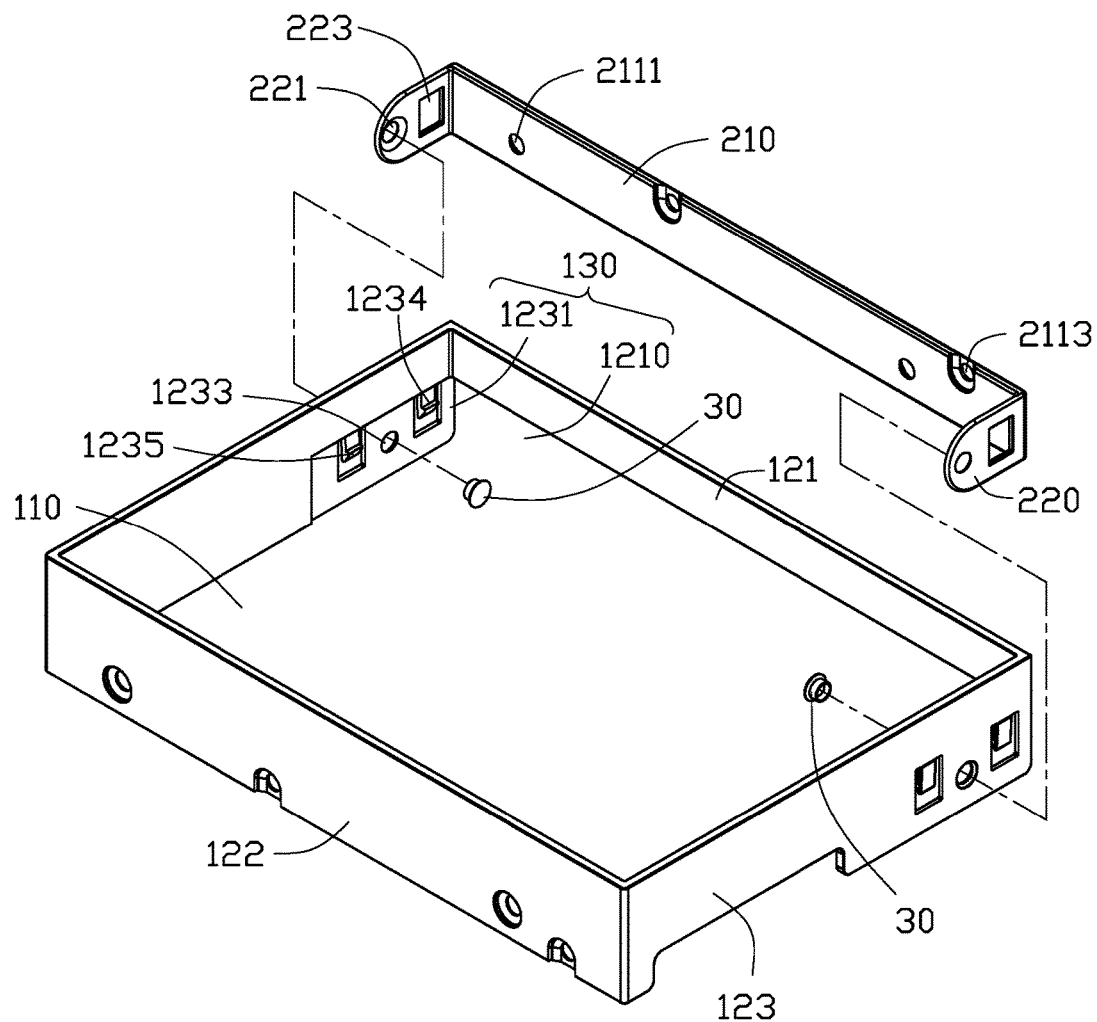
FIG. 3 is an exploded, isometric view of the carrier in FIG. 2.

Referring to FIG. 3, the connecting wall 121 defines a receiving room 1210. The coupling walls 123 each form a recess 1231 adjacent to the connecting wall 121. The recesses 1231 and the receiving room 1210 cooperatively define a receiving space 130 configured to accommodate the adjusting mechanism 20. In this embodiment, the recesses 1231 and the receiving room 1210 can be defined in side portions of the coupling walls 123 and the connecting wall 121. The recess 1231 and the receiving room 1210 are exposed outwards at the side portions of the coupling walls 123 and the connecting wall 121. Each of the two coupling walls 123 can further define a through hole 1233 for receiving a pivot 30. Each of the coupling walls 123 can form a first latch 1234 and a second latch 1235 at two opposite sides of the through hole 1233 in the recess 1231. In this embodiment, the first latch 1234 is adjacent to the connecting wall 121, the second latch 1235 is remote from the connecting wall 121.

The adjusting mechanism 20 includes an installing portion 210 configured to install a hard disk drive, and two coupling portions 220 extending from two opposite ends of the installing portion 210. The installing portion 210 can define two types of installing holes, including two first types of installing holes 2111 and two second type of installing holes 2113 configured to install two types of hard disk drives, respectively. Each of the two coupling portions 220 can define a through aperture 221 configured to receive the pivot 30. Each of the coupling portions 220 can further define an engaging hole 223 for engaging a corresponding one of the first latch 1234 and the second latch 1235 when the adjusting mechanism 20 is unmovable relative to the frame 10 for installing the hard disk drive.

The two coupling portions 220 can be received in the two recesses 1231 of the two coupling walls 123, respectively. Two pivots 30 are received in corresponding through holes 1233 of the coupling walls 123 and corresponding through apertures 221 of the coupling portions 220 to rotatably couple the coupling portions 220 to the coupling walls 123. The adjusting mechanism 20 is therefore rotatably coupled to the frame 10.

Figure 4:
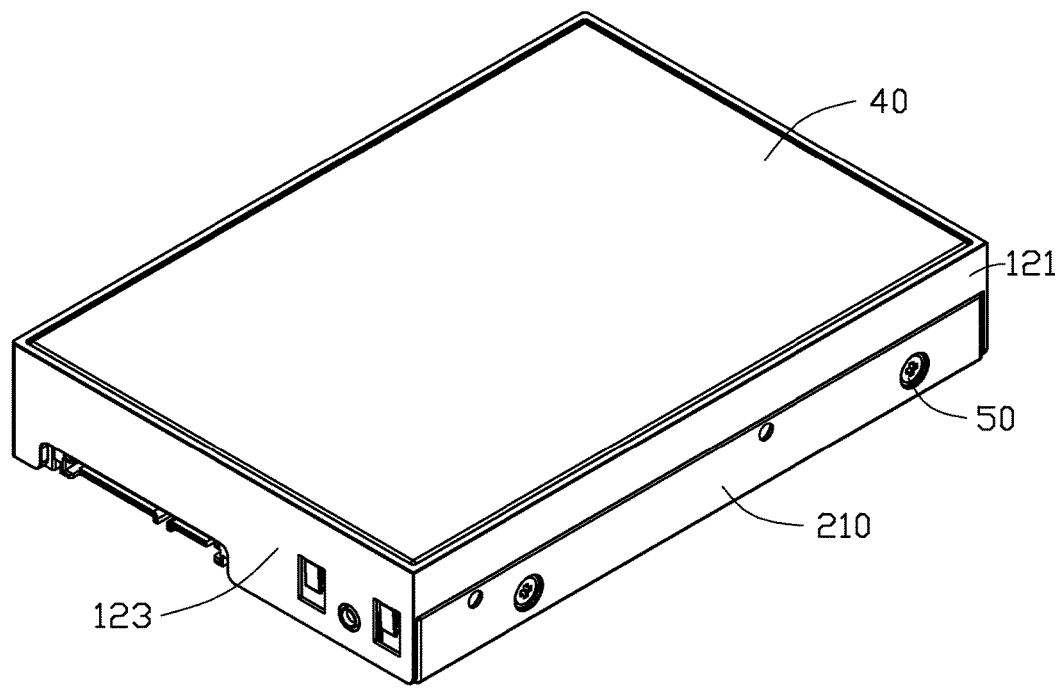
FIG. 4 is an assembled, isometric view of the carrier in FIG. 1 with a hard disk drive installed in the carrier.

Referring to FIG. 2 and FIG. 4, the carrier 1 is illustrated in a first configuration for carrying a first type of hard disk drive 40. The adjusting mechanism 20 is received in the receiving space 130 of the frame 10. The installing portion 210 of the adjusting mechanism 20 can be located under, and blocked by, the connecting wall 121 of the frame 10. The coupling portions 220 of the adjusting mechanism 20 have the first latches 1234 of the two coupling walls 123 engaging in corresponding engaging holes 223. The first latches 1234 lock the two coupling portions 220 to the two coupling walls 123. Therefore, the adjusting mechanism 20 is locked to be unmovable relative to the frame 10. Here, the adjusting mechanism 20 is in the first configuration, and is located outside the first space 110 defined by the frame 10. The adjusting mechanism 20 and the frame 10 cooperatively surround the first space 110 to accommodate the first type of hard disk drive 40 therein. Two bolts 50 can extend through the two first type of installing holes 2111 of the installing portion 210 to engage with the first type of hard disk drive 40. Therefore, the first type of hard disk drive 40 is installed in the first configuration cooperatively defined by the frame 10 and the adjusting mechanism 20.

Figure 5:
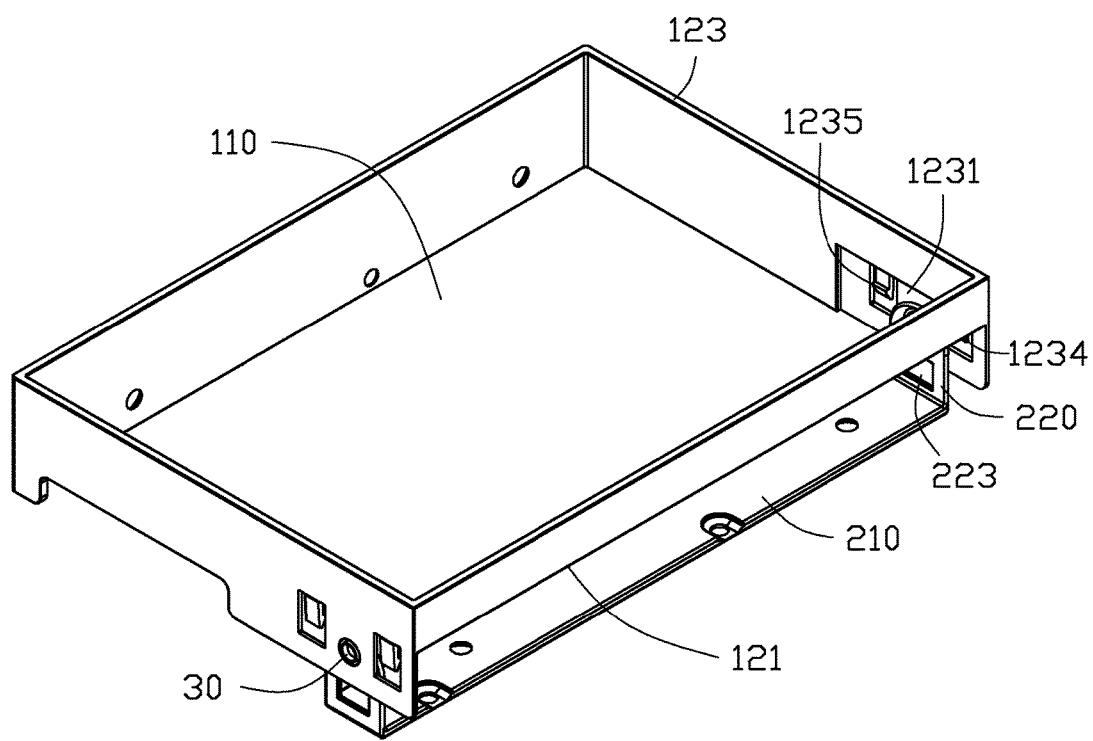
FIG. 5 is an assembled, isometric view of the carrier in FIG. 1 with an adjusting mechanism of the carrier being rotated.
Figure 6:
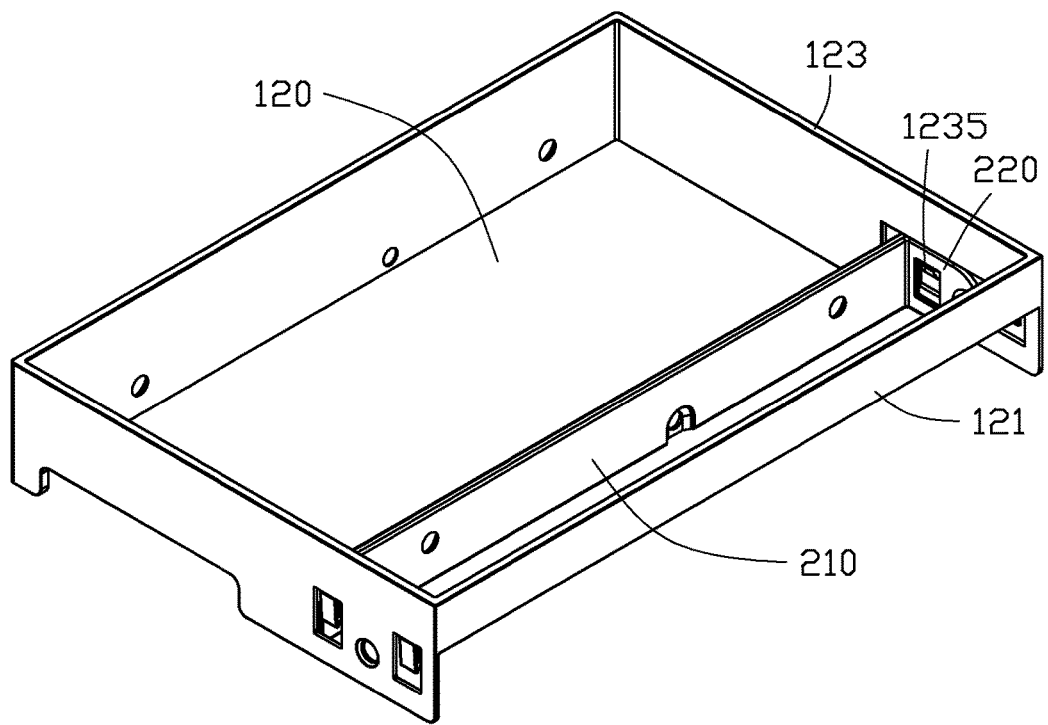
FIG. 6 is an assembled, isometric view of the carrier in FIG. 1 in a second configuration.

Referring to FIG. 5 and FIG. 6, the carrier 1 is transformed to be a second configuration from the first configuration, for installing a second type of hard disk drive. The two coupling portions 220 of the adjusting mechanism 20 are disengaged with the first latches 1234 of the coupling walls 123 of the frame 10. The adjusting mechanism 20 rotates 180 degrees about the two pivots 30 from the first configuration. The adjusting mechanism 20 in the second configuration is symmetrical to the adjusting mechanism 20 in the first configuration about a line where the two pivots 30 are located. The two coupling portions 220 are received in the recesses 1231 of the two coupling walls 123 of the frame 10, and are blocked and prevented, by the two coupling walls 123, from rotating more than 180 degrees. The coupling portions 220 have the second latches 1235 of the two coupling walls 123 engaging the engaging holes 223. The second latches 1235 lock the two coupling portions 220 to the two coupling walls 123. Therefore, the adjusting mechanism 20 is locked to be unmovable relative to the frame 10. Here, the adjusting mechanism 20 is in the second configuration, the adjusting mechanism 20 is located inside the first space 110 defined by the frame 10, and the adjusting mechanism 20 and the frame 10 cooperatively define and surround a second space 120 to accommodate a second type of hard disk drive therein. The second space 120 can be dimensionally different from the first space 110.

Figure 7:
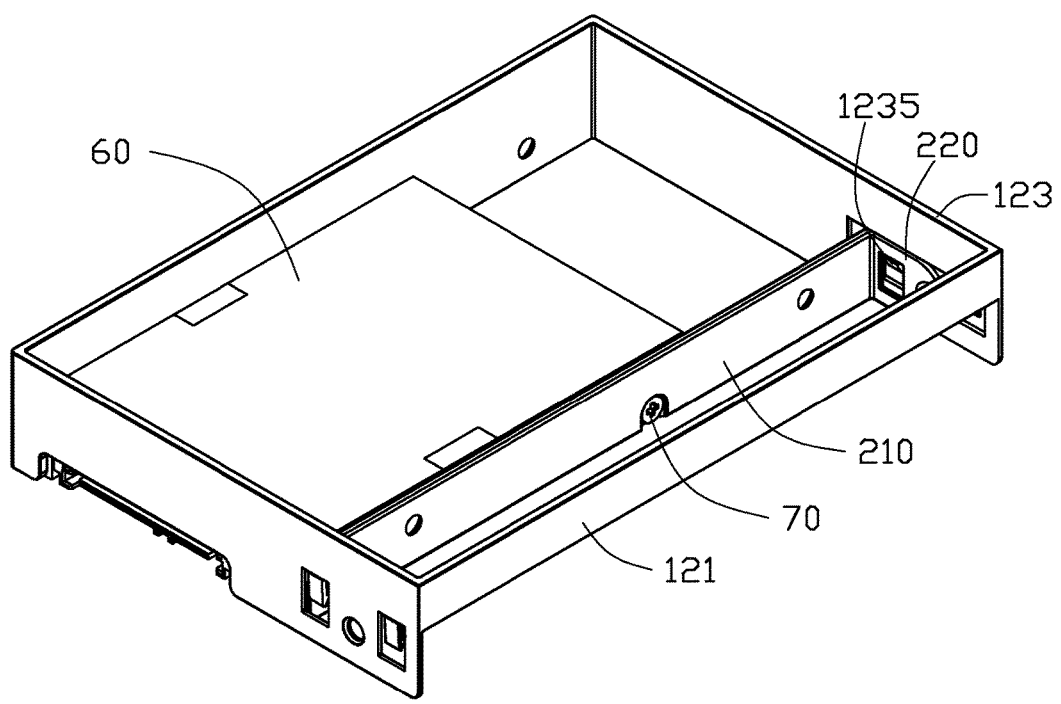
FIG. 7 an assembled, isometric view of the carrier in FIG. 6 with a hard disk drive installed in the carrier.

Referring to FIG. 7, the carrier 1 is illustrated for carrying a second type of hard disk drive 60. The second type of hard disk drive 60 is accommodated in the second space 120 which is cooperatively defined by the frame 10 and the adjusting mechanism 20. Two bolts 70 can extend through the two second type of installing holes 2113 of the installing portion 210 to engage with the second type of hard disk drive 60. Therefore, the second type of hard disk drive 60 is installed in the second configuration cooperatively defined by the frame 10 and the adjusting mechanism 20.

When the adjusting mechanism 20 is transmitted from the second configuration to the first configuration, the two coupling portions 220 of the adjusting mechanism 20 are disengaged with the second latches 1235 of the coupling walls 123 of the frame 10. The adjusting mechanism 20 rotates 180 degrees about the two pivots 30 from the second configuration. The two coupling portions 220 are received in the recesses 1231 of the two coupling walls 123, the installing portion 210 is received in the receiving room 1210 of the connecting wall 121, and the adjusting mechanism 20 is blocked and prevented by the connecting wall 121 and the two coupling walls 123 from rotating more than 180 degrees.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A carrier for a hard disk drive comprising:
   a frame, the frame comprising a first connecting wall and two coupling walls extending from opposite edges of the first connecting wall and defining a first space configured to accommodate a first hard disk drive;
   an adjusting mechanism rotatably coupled to the frame and comprising an installation portion and a coupling portion extending from each of two ends of the installation portion, and each coupling portion being rotatably coupled to a coupling wall, the adjusting mechanism transitionable between:
   (i) a first configuration in which the adjusting mechanism is located outside the first space defined by the frame, the installation portion being parallel to the first connecting wall, and configured to receive the first hard disk drive between the first connecting wall and the installation portion; and
   (ii) a second configuration in which the adjusting mechanism is located inside the first space, the installation portion being parallel to the first connecting wall, and the first connecting wall, the two coupling walls, and the installation portion cooperatively defining a second space configured to accommodate a second hard disk drive different from the first hard disk drive.

2. The carrier of claim 1, wherein the adjusting mechanism comprises an installing portion configured to install the first hard disk drive or the second hard disk drive, and two coupling portions extending from two opposite ends of the installing portion, the two coupling portions being rotatably coupled to the frame.

3. The carrier of claim 2, wherein the frame comprises two opposite coupling walls and a connecting wall connecting the two coupling walls, and the two coupling portions of the adjusting mechanism are rotatably coupled to the two coupling walls respectively.

4. The carrier of claim 3, wherein the two coupling walls each define a through hole, the two coupling portions each define a through aperture, and two pivots are received in corresponding through holes and corresponding through apertures to rotatably couple the coupling walls with the coupling portions.

5. The carrier of claim 4, wherein the two coupling walls each define a recess, the coupling portions being received in the recesses of the coupling walls respectively.

6. The carrier of claim 5, wherein the connecting wall defines a receiving room receiving the installing portion of the adjusting mechanism.

7. The carrier of claim 6, wherein the adjusting mechanism in the first configuration is symmetrical to the adjusting mechanism in the second configuration about a line where the two pivots are located.

8. The carrier of claim 7, wherein each of the coupling walls form two latches at two opposite sides of the through hole, each of the coupling portions defining an engaging hole, and each coupling wall having one of the latches engaging in a corresponding engaging hole to latch the adjusting mechanism in the first configuration or the second configuration.

9. The carrier of claim 3, wherein the adjusting mechanism is prevented by the coupling walls from rotating more than 180 degrees.

10. The carrier of claim 1, wherein the adjusting mechanism defines two installing holes configured to install the first hard disk drive and the second hard disk drive.

11. A carrier for a hard disk drive, the carrier comprising:
a frame comprising a first connecting wall and two coupling walls extending from opposite edges of the first connecting wall and at least partially defining a hard disk receiving space and wherein the receiving space is variably configurable to accommodate differently configured hard disk drives; and
an adjusting mechanism pivotably coupled to the frame and comprising an installation portion and a coupling portion extending from each of two ends of the installation portion, each coupling portion being rotatably coupled to a coupling wall, the adjusting mechanism transitionable between:
(i) a first configuration in which the installation portion is parallel to the first connecting wall, and the first connecting wall, the two coupling walls, and the installation portion cooperatively defining a first hard disk drive receiving space, and
(ii) a second configuration in which the adjusting mechanism is located within the first hard disk drive receiving space, the installation portion being parallel to the first connecting wall, and the first connecting wall, the two coupling walls, and the installation portion cooperatively defining a second hard disk drive receiving space different from the first hard disk drive receiving space.

\* \* \* \* \*